(12) United States Patent
Tanigawa et al.

(10) Patent No.: US 8,493,930 B2
(45) Date of Patent: Jul. 23, 2013

(54) COMMUNICATION SYSTEM, BASE STATION AND MOBILE STATION USED IN THE COMMUNICATION SYSTEM, AND BASE STATION SWITCHING METHOD

(75) Inventors: Hironobu Tanigawa, Kanagawa (JP); Yasuhiro Nakamura, Kanagawa (JP); Nobuaki Takamatsu, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 888 days.

(21) Appl. No.: 12/447,425

(22) PCT Filed: Oct. 25, 2007

(86) PCT No.: PCT/JP2007/070856
§ 371 (c)(1),
(2), (4) Date: Sep. 10, 2009

(87) PCT Pub. No.: WO2008/053788
PCT Pub. Date: May 8, 2008

(65) Prior Publication Data
US 2010/0111037 A1 May 6, 2010

(30) Foreign Application Priority Data

Oct. 27, 2006 (JP) .............................. P2006-293240
Oct. 27, 2006 (JP) .............................. P2006-293242

(51) Int. Cl.
*H04W 36/00* (2009.01)
(52) U.S. Cl.
USPC ............ 370/331; 370/329; 455/464; 455/436
(58) Field of Classification Search
USPC ........................... 370/331, 329; 455/436, 464
See application file for complete search history.

(56) References Cited

U.S. PATENT DOCUMENTS

| | | | | |
|---|---|---|---|---|
| 6,532,223 | B1 | 3/2003 | Sakoda et al. | 370/337 |
| 6,556,834 | B1* | 4/2003 | Kobayashi et al. | 455/464 |
| 7,573,851 | B2 | 8/2009 | Xing et al. | |
| 2002/0159430 | A1 | 10/2002 | Atarashi et al. | 370/347 |
| 2006/0223449 | A1 | 10/2006 | Sampath et al. | |
| 2006/0281461 | A1* | 12/2006 | Kwun et al. | 455/436 |
| 2008/0095106 | A1* | 4/2008 | Malladi et al. | 370/329 |

FOREIGN PATENT DOCUMENTS

| | | |
|---|---|---|
| JP | 11-113044 | 4/1999 |
| JP | 2000092554 A | 3/2000 |

(Continued)

OTHER PUBLICATIONS

Japanese language office action dated Nov. 8, 2011 and its English language translation for corresponding Japanese application 2006293242.

*Primary Examiner* — Dang Ton
*Assistant Examiner* — Pamit Kaur
(74) *Attorney, Agent, or Firm* — DLA Piper LLP (US)

(57) ABSTRACT

There are provided an OFDMA communication system capable of reducing a time necessary for a handover without releasing a wireless communication with a base station as a handover source to search base stations, a base station and a mobile station used in the communication system, and a base station switching method.
In an OFDMA communication system in which data communication is performed between a plurality of base stations 10 and a plurality of mobile stations, each base station 10 includes subchannel assignment setting unit 15-1 which sets assignment of subchannels including a first subchannel and a second subchannel for each of the mobile stations, the first subchannel including information indicating usable or unusable subchannels of the respective mobile stations and being assigned to the respective mobile stations, the second subchannel including actually-used data. When a request for switching the first subchannel is received from one of the mobile stations 20, the second subchannel is collected and assigned to a same slot as the first subchannel assigned to the one of the mobile stations 20.

12 Claims, 16 Drawing Sheets

FOREIGN PATENT DOCUMENTS

| | | |
|---|---|---|
| JP | 2001-203665 | 7/2001 |
| JP | 2002-300628 | 10/2002 |
| JP | 2005-304063 | 10/2005 |
| JP | 2006-279635 | 10/2006 |
| WO | 2006062994 A2 | 6/2006 |
| WO | 2006107835 A1 | 10/2006 |

* cited by examiner

US 8,493,930 B2

COMMUNICATION SYSTEM, BASE STATION AND MOBILE STATION USED IN THE COMMUNICATION SYSTEM, AND BASE STATION SWITCHING METHOD

CROSS-REFERENCE TO THE RELATED APPLICATIONS

This application is a national stage of international application No. PCT/JP2007/070856 filed on Oct. 25, 2007, which also claims the benefit of priority under 35 USC §119 to Japanese Patent Application No. 2006-293240 filed on Oct. 27, 2006 and Japanese Patent Application No. 2006-293242filed on Oct. 27, 2006, the entire contents of all of which are incorporated herein by reference.

TECHNICAL FIELD

The present invention relates to an OFDMA communication system, a base station and a mobile station used in the communication system, and a base station switching method for handover in the communication system.

BACKGROUND ART

As a radio access scheme of a PHS system or the like, a TDMA (Time Division Multiple Access)/TDD (Time Division Duplex) scheme has been employed in which a TDMA system and a TDD system are combined. Recently, an OFDMA (Orthogonal Frequency Division Multiplexing Access) system employing an OFDMA scheme based on an OFDM (Orthogonal Frequency Division Multiplexing) technique has been proposed.

The OFDM is a scheme of dividing a carrier for data modulation into a plurality of "subcarriers" (subdivided carriers) orthogonal to each other and distributing and transmitting a data signal in each subcarrier.

Hereinafter, an overview of the OFDM scheme will be described.

FIG. 15 is a block diagram illustrating a configuration of the OFDM modulation device used at a transmission side. Transmission data is input to the OFDM modulation device. The transmission data is supplied to a serial/parallel conversion unit 201 and converted into data including a plurality of low-speed transmission symbols. That is, a plurality of low-speed digital signals are generated by dividing transmission information. This parallel data is supplied to an inverse fast Fourier transformation (IFFT) unit 202.

The parallel data is allocated to each subcarrier configuring OFDM and mapped in a frequency domain. Here, the subcarrier is modulated by BPSK, QPSK, 16QAM, 64QAM, or the like. The mapping data is converted from frequency-domain transmission data to time-domain transmission data by performing an IFFT operation. Accordingly, multi-carrier modulation signals into which a plurality of subcarriers orthogonal to each other are modulated independently are generated. An output of the IFFT unit 202 is supplied to a guard interval addition unit 203.

As shown in FIG. 16, the guard interval addition unit 203 sets a rear part of an effective symbol of transmission data as a guard interval and adds its copy to a front part of an effective symbol period for each transmission symbol. A base-band signal obtained by the guard interval addition unit is supplied to an orthogonal modulation unit 204.

The orthogonal modulation unit 204 orthogonally modulates a base-band OFDM signal supplied from the guard interval addition unit 203 using a carrier signal supplied from a local oscillator 205 of the OFDM modulation device, and performs frequency conversion into intermediate frequency (IF) signal or a radio frequency (RF) signal. That is, after frequency-converting the base-band signal into a desired transmission frequency band, the orthogonal modulation unit outputs it to a transmission path.

FIG. 17 is a block diagram illustrating a configuration of an OFDM demodulation device to be used in a receiving side. An OFDM signal generated by the OFDM modulation device of FIG. 15 is input to the OFDM demodulation device through a predetermined transmission path.

An OFDM reception signal input to the OFDM demodulation device is supplied to the orthogonal demodulation unit 211. The orthogonal demodulation unit 211 orthogonally demodulates the OFDM reception signal using a carrier signal supplied from a local oscillator 212 of the OFDM demodulation device, performs frequency conversion from a RF signal or an IF signal into a base-band signal, and obtain a base-band OFDM signal. The OFDM signal is supplied to a guard interval removing unit 213.

The guard interval removing unit 213 removes a signal added by the guard interval addition unit 203 of the OFDM modulation device according to a timing signal supplied from a symbol timing synchronization unit (not shown). A signal obtained by the guard interval removing unit 203 is supplied to a fast Fourier transformation (FFT) unit 214.

The FFT unit 214 performs conversion to frequency-domain reception data by performing an FFT operation on input time-domain reception data. De-mapping is performed in the frequency domain and parallel data is generated for each subcarrier. Here, the demodulation to the modulation of BPSK, QPSK, 16QAM, 64QAM, or the like performed for each subcarrier is performed. Parallel data obtained by the FFT unit 214 is supplied to a parallel/serial conversion unit 215 and output as reception data.

The OFDM is a scheme for dividing a carrier into a plurality of subcarriers. The OFDMA is a scheme for collecting and grouping a plurality of subcarriers among the subcarriers in the OFDM and performing multiplex communication by allocating one or more groups to each user. Each group is called a subchannel. That is, each user performs a communication using one or more allocated subchannels. According to a communication data amount, a propagation environment, and the like, subchannels are adaptively increased and decreased, and allocated.

In a PHS system employing such OFDMA scheme, a frame is configured so as to include, for example, four time slots, where the vertical axis represents a frequency and the horizontal axis represents a time. A downlink period and an uplink period are both divided into a plurality of frequency bands in the frequency axis. The subchannel allocated to the first frequency band is called control subchannel and is used as a control channel (CCH). The other frequency bands are configured as traffic channels (TCH) each including a plurality of subchannels.

When a mobile station moves to a boundary of a cell which is a range wirelessly communicable with a base station or when radio waves from the base station in communication are weakened to disable the communication, switching to a base station having strong radio waves in another cell is performed after or before the radio waves are weakened, which is called a handover.

Such a handover is performed as follows, for example, as described in Patent Document 1.

FIG. 18 shows a situation in which a wireless communicable range with a base station BTS 101 is a cell 112 and a wireless communicable range with a base station BTS 102 is a cell 113, a mobile station MS 107 is moving from the cell 112 of the base station BTS 101 as a handover source to the cell 113 of the base station BTS 102 as a handover destination.

The mobile station MS 107 monitors the power of the mobile station MS 107 during communication with the base station BTS 101 and notifies a center MSC 111 of the monitoring result when a handover to the base station BTS 102 is predicted. The mobile station MS 107 receives a list of neighbor base stations, monitors signals from the neighbor base stations at a constant time interval on the basis of the list, and notifies the base station BTS 101 of the monitoring result. When a boundary condition of the handover is satisfied, a message is transmitted to a base station controller BSC 109. The message includes a parameter for recognizing the mobile station MS and data on a new channel (time slot) to be used in a communication between the mobile station MS and the base station BTS 102 from now on. The handover to the base station BTS 102 is started under the control of the MSC 111 when the mobile station MS 107 is in the overlap range of the cell 112 and the cell 113, and the handover is ended when the mobile station 107 enters the cell 113.

Patent Document 1: JP-A-2002-300628 (pages 3 and 4 and FIG. 10)

DISCLOSURE OF THE INVENTION

Problem to be Solved by the Invention

In the communication system employing the above-mentioned OFDMA scheme, since a communication can be made without using the entire bandwidth of the communication system, a mobile station only using a narrow communication bandwidth which is a part of the communication system can be used. The mobile station using a narrow communication bandwidth can reduce a manufacturing cost thereof, compared with a mobile station using the entire bandwidth of the communication system.

In the communication system employing the OFDMA scheme, a control channel (CCH) uses a specific slot. Accordingly, when a communication is performed through a subchannel apart in frequency from the control channel, the mobile station using a narrow communication bandwidth cannot receive information through the control channel during the communication and thus cannot control a handover using the control channel.

There is a great difference in reception level between the control channel and the traffic channel. Accordingly, when a mobile station using a wide communication bandwidth and receiving information through both the traffic channel and the control channel receives information in the same slot and amplifies signals in accordance with a reception level of one of the channels in communication, information may not received through the other channel. That is, the control channel in the same slot as the traffic channel during a communication may not be utilized.

Therefore, when a handover is necessary, base stations as a handover destination have to be searched using a control channel after releasing the wireless connection with the base station as a handover source. However, in this case, the time necessary for the handover is elongated.

Accordingly, instantaneous interruption may occur in the communication and call cutoff may occur at the worst.

The present invention is made to solve the above-described problems, and an object of the present invention is to provide an OFDMA communication system capable of reducing a time necessary for a handover without releasing a wireless communication with a base station as a handover source and searching base stations when a mobile station using a narrow communication bandwidth make a communication through a subchannel apart in frequency from a control channel or searches a base station as a handover destination using the control channel in the same slot as a traffic channel in communication, a base station and a mobile station used in the communication system, and a base station switching method.

Means for Solving the Problem

In order to solve the problem, according to the present invention, there is provided an OFDMA communication system in which data communication is performed between a plurality of base stations and a plurality of mobile stations, wherein each of the base stations comprises a subchannel assignment setting unit which sets assignment of subchannels including a first subchannel and a second subchannel for each of the mobile stations, the first subchannel including information indicating usable or unusable subchannels of the respective mobile stations and being assigned to the respective mobile stations, the second subchannel including actually-used data, and wherein when a request for switching the first subchannel is received from one of the plurality of mobile stations, the second subchannel is collected and assigned to a same slot as the first subchannel assigned to the one of the mobile station (claim 1).

According to a system of the present invention, there is provided an OFDMA communication system in which data communication is performed between a plurality of base stations and a plurality of mobile stations, wherein each of the base stations comprises a subchannel assignment setting unit which sets assignment of subchannels including a first subchannel and a second subchannel for each of the mobile stations, the first subchannel including information indicating usable or unusable subchannels of the respective mobile stations and being assigned to the respective mobile stations, the second subchannel including actually-used data, and wherein when a request for switching the first subchannel is received from one of the plurality of mobile stations, at least one slot is released for a control channel used by a base station (claim 2).

According to the present invention, there is provided an OFDMA communication system in which data communication is performed between a plurality of base stations and a mobile station, the communication system comprising: a mobile station state determining unit which determines a state of the mobile station; a handover-destination base station searching unit which searches base stations as handover destination candidates when the mobile station state determining unit determines that the mobile station is in a perch state; a communication state measuring unit which measures a communication state with the base stations as the handover destination candidates; and a handover destination list preparing unit which prepares a handover destination list including a priority order of the base stations as the handover destination candidates on the basis of the communication state measured by the communication state measuring unit, wherein when a handover becomes necessary, a connection between the mobile station and the base stations as the handover destination candidates is tried in accordance with the priority order in the handover destination list (claim 3).

According to the present invention, a time stamp of date and time when the list is prepared is recorded in the handover destination list, and when a plurality of the handover destination lists exist, a handover destination list having a newest time stamp is used (claim 4).

According to the present invention, there is provided a base station comprising: a subchannel assignment setting unit which sets assignment of subchannels including a first subchannel and a second subchannel for each of a plurality of mobile stations, the first subchannel including information indicating usable or unusable subchannels of the respective mobile stations and being assigned to the respective mobile stations, the second subchannel including actually-used data, wherein when a request for switching the first subchannel is received from one of the plurality of mobile stations, information on subchannel assignment in which the second subchannel is collected and assigned to a same slot as the first subchannel is transmitted to the one of the mobile stations (claim 5).

According to the present invention, there is provided a base station used in the communication system of claim 3 or 4, wherein when a communication data amount decreases to no transmission data, the base station connects with a mobile station using only a first subchannel including information indicating usable or unusable subchannels of the mobile station and which is assigned to the mobile station (claim 6).

According to the present invention, there is provide a mobile station used in the communication system of claim 1 or 2, the mobile station comprising a communication state measuring unit which measures a communication state with a base station as a switching destination and a switching-destination base station searching unit which searches a base station as a switching destination (claim 7).

According to the present invention, there is provided a mobile station in an OFDMA communication system, the mobile station comprising: a mobile station state determining unit which determines a state of the mobile station; a handover-destination base station searching unit which searches base stations as handover destination candidates when the mobile station state determining unit determines that the mobile station is in a perch state; a communication state measuring unit which measures a communication state with the base stations as the handover destination candidates; a handover destination list preparing unit which prepares a handover destination list including a priority order of the base stations as the handover destination candidates on the basis of the communication state measured by the communication state measuring unit; and a handover destination list storage unit which stores the handover destination list while adding a time stamp of date and time when the base stations as the handover destination candidates are searched (claim 8).

According to the present invention, there is provided a base station switching method for a handover in the communication system of claim 1 or 2, the method comprising: transmitting a request for switching the first subchannel from a mobile station to a base station as a switching source when a downlink radio quality degrades; collecting and assigning the second subchannel to a same slot as the first subchannel in the base station as the switching source, and transmitting information on subchannel assignment in which the first subchannel and the second subchannel are collected in the same slot, to the mobile station; receiving the information on the subchannel assignment and searching neighbor base stations using all relative slots not used in communication by the mobile station; and setting up a link between the mobile station and a base station as a switching destination detected by the searching and cutting off a link between the mobile station and the base station as the switching source (claim 9).

According to the present invention, there is provided a base station switching method for a handover in the communication system of claim 1 or 2, the method comprising: transmitting a handover instruction from a base station as a switching source to a mobile station when an uplink radio quality degrades; receiving the handover instruction and transmitting a request for switching the first subchannel from the mobile station to the base station as the switching source; collecting and assigning the second subchannel to a same slot as the first subchannel in the base station as the switching source, and transmitting information on subchannel assignment in which the first subchannel and the second subchannel are collected in the same slot, to the mobile station; receiving the information on the subchannel assignment and searching neighbor base stations using all relative slots not used in communication by the mobile station; and setting up a link between the mobile station and a base station as a switching destination detected by the searching and cutting off a link between the mobile station and the base station as the switching source (claim 10).

According to the present invention, there is provided a base station switching method for a handover in the communication system of claim 3 or 4, the method comprising: selecting a base station as a switching destination using the handover destination list by the mobile station when a downlink radio quality degrades; and setting up a link between the mobile station and the selected base station as the switching destination and cutting off a link between the mobile station and a base station as a switching source (claim 11).

According to the present invention, there is provided a base station switching method for a handover in the communication system of claim 3 or 4, the method comprising: transmitting a handover instruction from a base station as a switching source to a mobile station when an uplink radio quality degrades; receiving the handover instruction and selecting a base station as a switching destination using the handover destination list in the mobile station; and setting up a link between the mobile station and the selected base station as the switching destination and cutting off a link between the mobile station and the base station as the switching source (claim 12).

Advantage of the Invention

According to the invention, when a first subchannel switching request is received from a mobile station, second subchannels are collected and assigned to a same slot as the first subchannel assigned to the mobile station, whereby it is possible to search the base station as a handover destination using a slot other than the slot in which the first subchannel and the second subchannels are collected.

A mobile station in communication can transmit and receive information through a control channel by releasing at least one slot for use in a base station.

According to the invention, in the communication system employing an OFDMA scheme, by searching candidate base stations as a handover destination and previously preparing a handover destination list in which priority as a handover destination is given to the candidate base stations when a mobile station is in a perch state, it is possible to access the optimal base station included in the list with reference to the handover destination list without searching the base stations when a handover is necessary.

Therefore, when a mobile station using a narrow communication bandwidth make a communication through a subchannel apart in frequency from a control channel or searches base stations as a handover destination using the control channel in the same slot as a traffic channel in communication and a handover is necessary, it is possible to reduce a time required for the handover without releasing a wireless communication with the base station as a handover source and searching the base stations.

Figure 1:
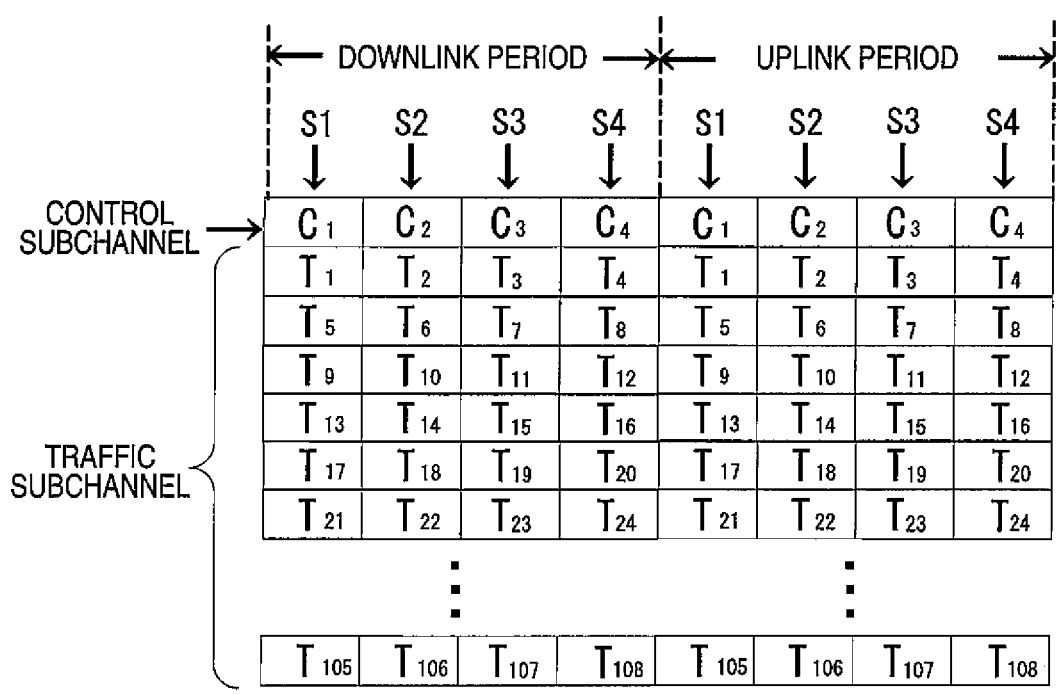
FIG. 1 is a diagram illustrating a configuration of an OFDMA frame used in a communication method according to a first embodiment of the invention.

DESCRIPTION OF REFERENCE NUMERALS AND SIGNS 10, 10A, 10B: base station
10-1, 10-2, 10-3, 10-4, 10-5, 10-$n$: base station
11: wireless communication unit
12: signal processing unit
13: modulation and demodulation unit
14: external I/F unit
15: control unit 15-1: subchannel assignment setting unit (subchannel assignment setting means)
20, 20A, 20B: mobile station
21: wireless communication unit
22: signal processing unit
23: modulation and demodulation unit
24: input and output unit
25: control unit
25-1: communication state measuring unit (communication state measuring means)
25-2: handover-destination base station searching unit (handover-destination base station searching means)
25-3: mobile station measuring unit (mobile station state measuring means)
25-4: handover destination list preparing unit (handover destination list preparing means)
25-5: handover destination list storage unit

BEST MODE FOR CARRYING OUT THE INVENTION

Before describing embodiments of the present invention, a frame configuration of an OFDMA scheme used in a communication system and a communication method according to embodiments of the invention will be first described with reference to FIG. 1.

In the frame configuration shown in FIG. 1, for example, four time slots (S1 to S4) are used in a PHS system, the vertical axis represents frequency, and the horizontal axis represents time. In FIG. 1, a downlink period (communication from a base station to a mobile station) and an uplink period (communication from a mobile station to a base station) are both divided into 28 frequency bands with respect to the frequency axis. The subchannel of the first frequency band is called a control subchannel and is used as a control channel (CCH). The control subchannel instructs which subchannel of the respective time slots should be used in each frequency band.

FIG. 1 shows an example of the PHS system, where four base stations can be designated by the control subchannels $C_1$ to $C_4$. In the PHS system, information is intermittently transmitted through the control channels every 100 ms.

The remaining 27 frequency bands include traffic subchannels $T_1$ to $T_{108}$ for transmitting and receiving data. 108 subchannels in total are provided by the number of 27 in the frequency axis direction and the number of 4 in the time axis direction.

The traffic subchannels include an anchor subchannel as a first subchannel and an extra subchannel as a second subchannel.

The anchor subchannel (first subchannel) is a subchannel which is used to notify the respective mobile stations of subchannels assigned to the mobile stations, and which is used to allow the base station and the mobile station to negotiate whether data is correctly exchanged in a re-transmission control.

The extra subchannel (second subchannel) is a subchannel for transmitting actually-used data and plural extra subchannels can be assigned to one mobile station. In this case, as the number of assigned extra subchannels increases, the bandwidth becomes wider, thereby enabling a faster communication.

Subchannel assignment information indicating which subchannels should be assigned to communication between each mobile station and a base station is called MAP information, which is notified from the base station to the mobile stations in advance.

Figure 2:
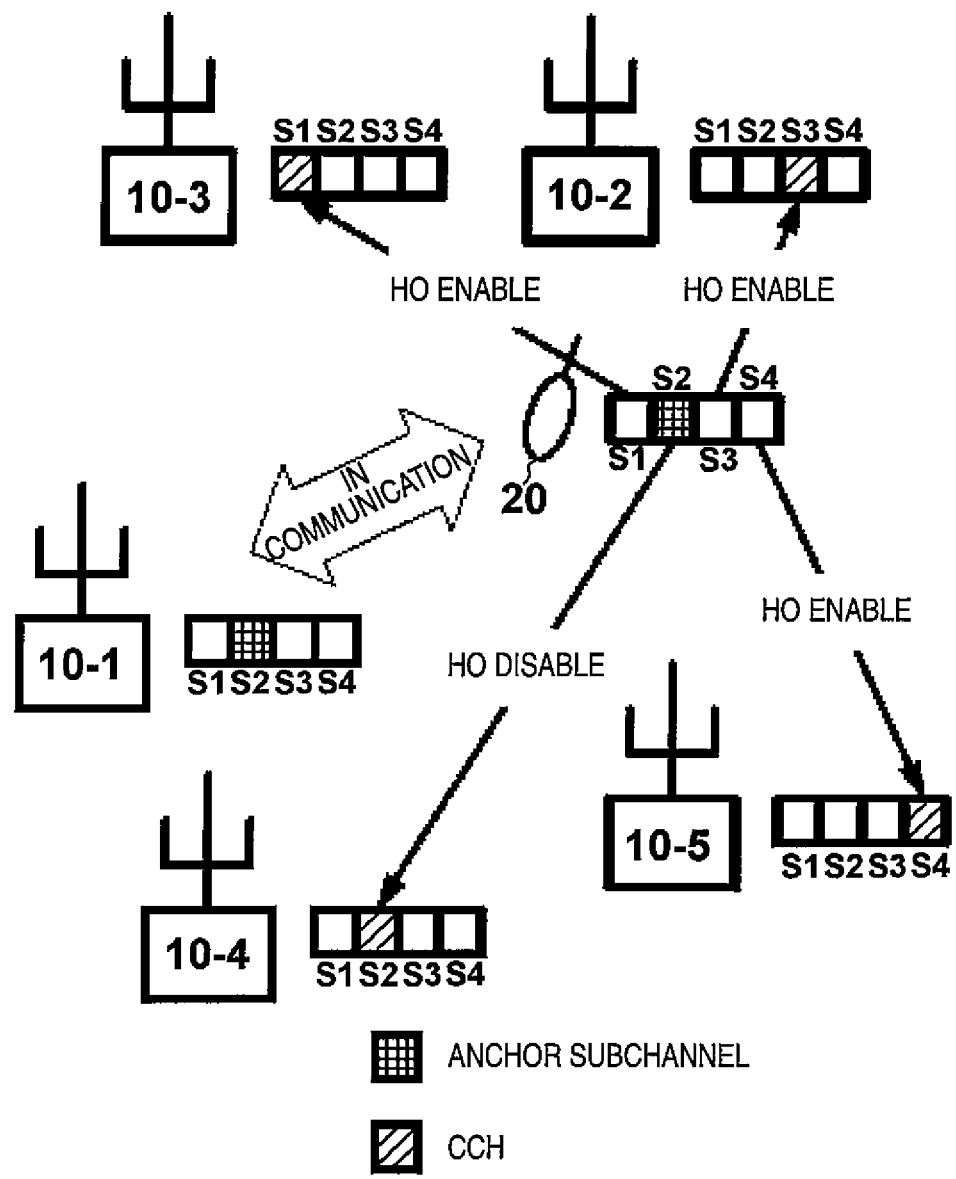
FIG. 2 is a diagram schematically illustrating a handover method between a mobile station and plural base stations in a communication system according to the first embodiment of the invention.

Hereinafter, a communication system according to embodiments of the present invention will be described in detail with reference to the accompanying drawings. FIG. 2 is a diagram schematically illustrating a handover method between a mobile station and plural base stations in a communication system according to a first embodiment and a second embodiment of the present invention.

In FIG. 2, a mobile station 20 is in communication with a base station 10-1 while using an anchor subchannel of slot S2. When the mobile station 20 moves to a boundary of a range where the mobile station can wirelessly communicate with the base station 10-1 or when radio waves from the base station 10-1 in communication are weakened to disable the communication for other reasons, a handover for switch to a base station having stronger radio waves need to be performed after or before the radio waves are weakened.

In the case of FIG. 2, it is assumed that plural neighbor base stations 10-2 to 10-5 exist. When the mobile station 20 is in a perch state, the mobile station can communicate through only the anchor subchannel and thus can receive a control channel (CCH) in three time slots other than the slot used in the anchor subchannel. For example. in FIG. 2, the base stations 10-2, 10-3, and 10-5 is enabled in handover (HO) and the base station 10-4 is disabled in handover (HO).

First Embodiment

Configurations of a mobile station and a base station used in a communication system and a communication method according to the first embodiment of the present invention will be described.

Figure 3:
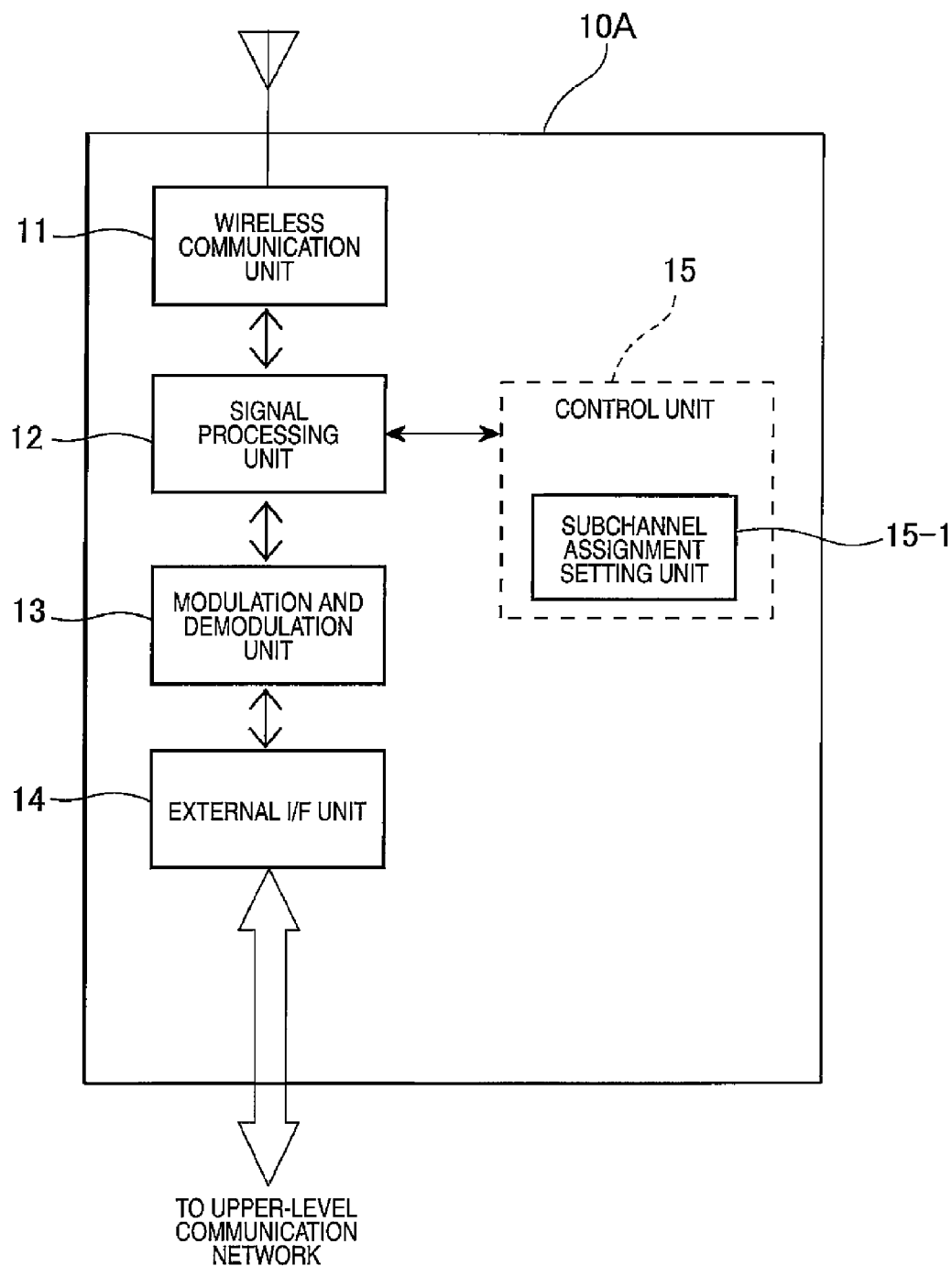
FIG. 3 is a block diagram illustrating a configuration of a base station in the communication system according to the first embodiment of the invention.
Figure 4:
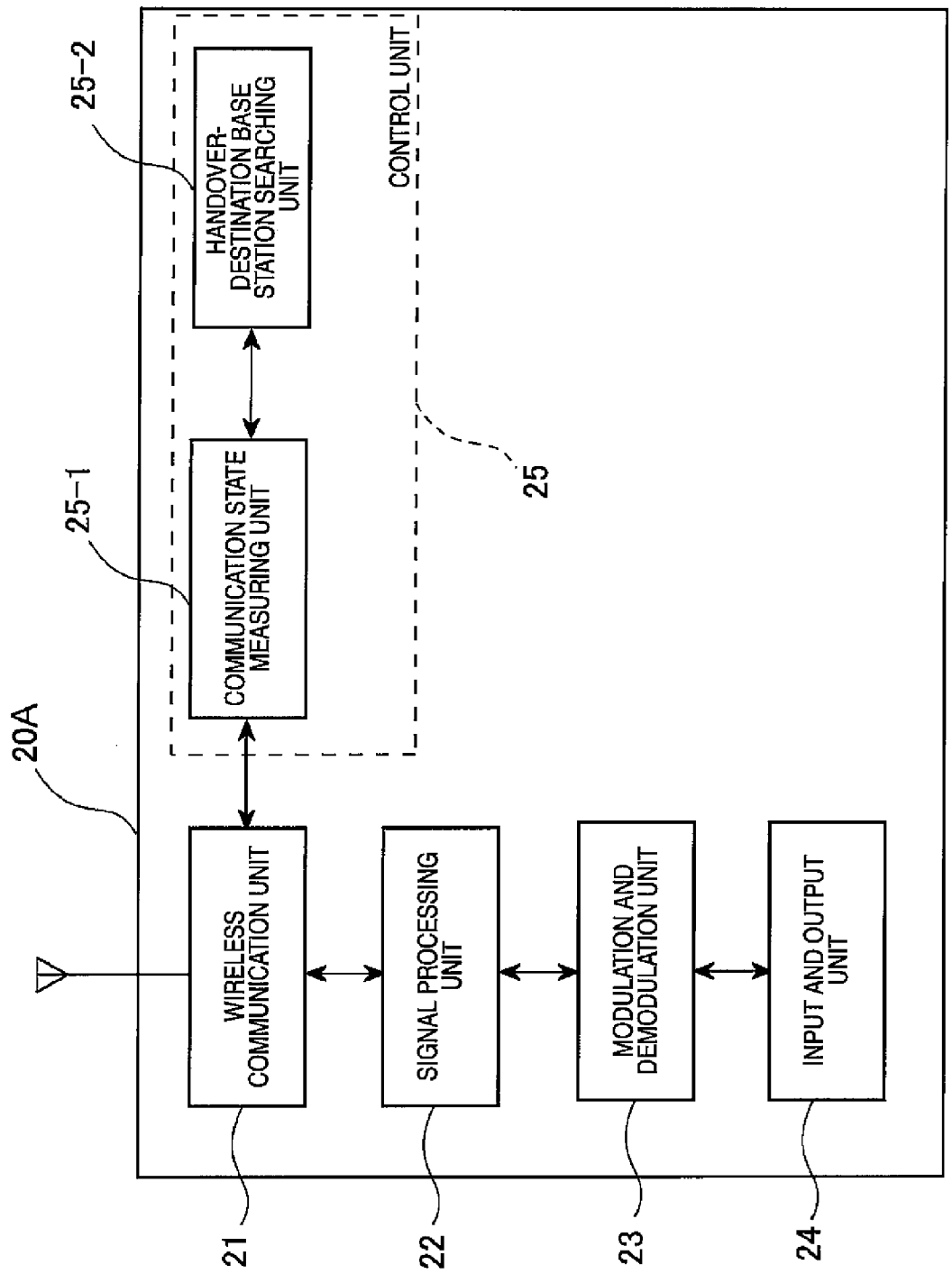
FIG. 4 is a block diagram illustrating a configuration of a mobile station in the communication system according to the first embodiment of the invention.

FIG. 3 is a block diagram illustrating a configuration of a base station and FIG. 4 is a block diagram illustrating a configuration of a mobile station.

As shown in FIG. 3, a base station 10A (base station 10 according to the first embodiment) includes a wireless communication unit 11 which is connected to an antenna, converts a signal from a signal processing unit 12 to be described later into an RF signal and converts the received RF signal into a signal which can be treated by the signal processing unit 12, a signal processing unit 12 which processes a received signal or a transmission signal, a modulation and demodulation unit 13 which modulates and demodulates a signal, an external I/F unit 14 which is connected to an upper-level communication network, and a control unit 15 which controls the signal processing unit 12 and the modulation and demodulation unit 13.

The control unit 15 includes a subchannel assignment setting unit 15-1 which sets assignment of subchannels including an anchor subchannel (ASCH) and extra subchannels (ESCH) for each of the mobile stations. The anchor subchannel includes information indicating usable or unusable subchannels of each mobile station and being assigned to each mobile station and the extra subchannels (ESCH) includes actually-used data.

The subchannel assignment setting unit 15-1 collects and assigns the extra subchannels (ESCH) to the same slot as the anchor subchannel (ASCH) when receiving an anchor subchannel (ASCH) switching request from a mobile station.

Accordingly, the base station 10A transmits to the mobile station subchannel assignment information (MAP information) indicating that the anchor subchannel (ASCH) and the extra subchannels (ESCH) are collected in one slot.

As shown in FIG. 4, a mobile station 20A (mobile station 20 according to the first embodiment) includes a wireless communication unit 21 which is connected to an antenna and converts a signal from a signal processing unit 22 to be described later into an RE signal or converts the received RF signal into a signal which can be treated by the signal processing unit 22, a signal processing unit 22 which processes a received signal or a transmission signal, a modulation and demodulation unit 23 which modulates or demodulates a signal, an input and output unit 24 for inputting and outputting data or sound, and a control unit 25 which controls the signal processing unit 22 and the wireless communication unit 21.

The control unit 25 includes a communication state measuring unit 25-1 which measures a communication state (for example, SINR, RSSI, and the like) with a base station as a switching destination for a handover, and a handover-destination base station searching unit 25-2 which searches a base station as a switching destination.

Figure 5:
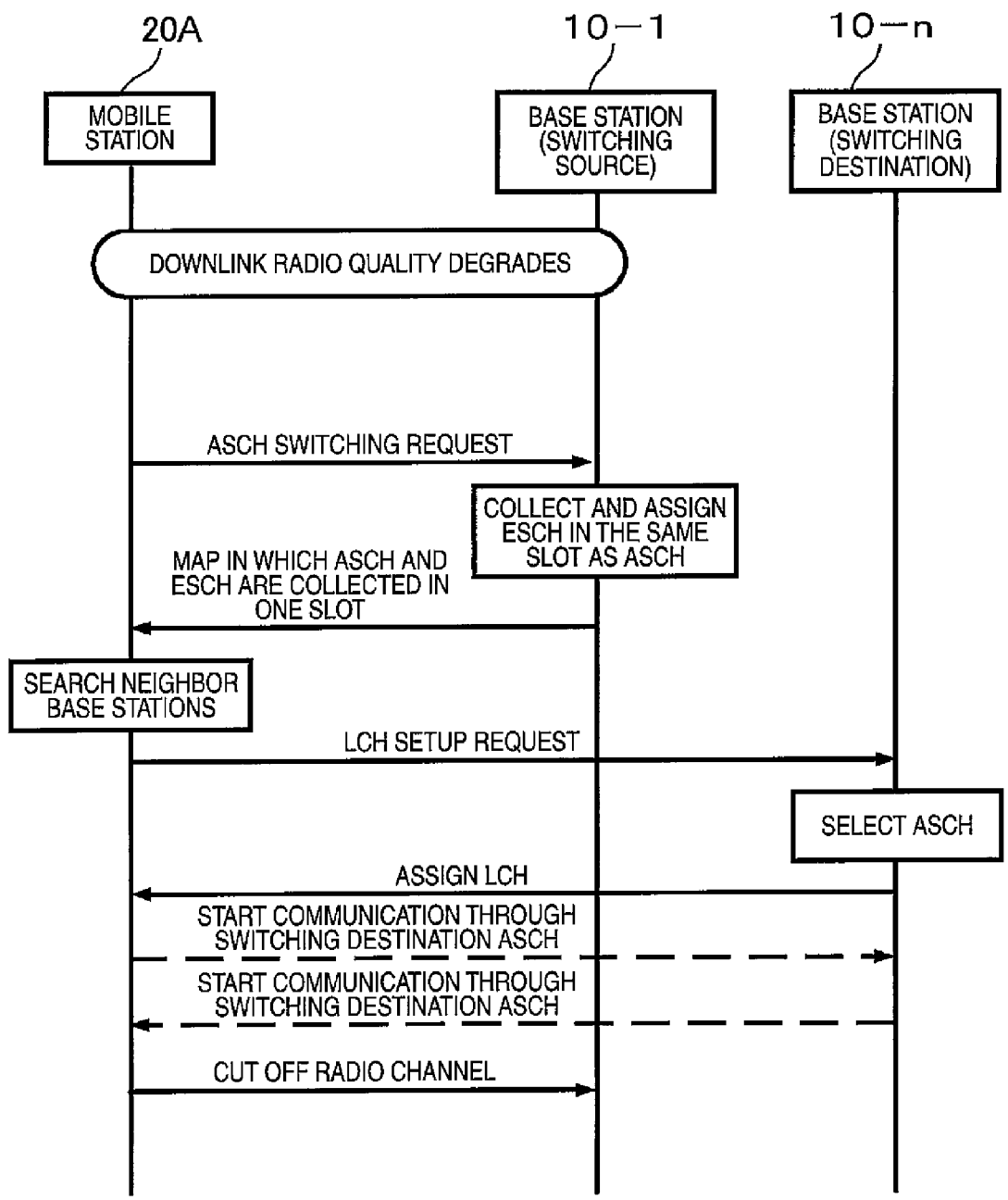
FIG. 5 is a diagram illustrating a handover sequence started by the mobile station in the communication system according to the first embodiment of the invention.

A handover sequence in the communication system according to the first embodiment of the invention will be described. First, the handover sequence started by a mobile station in the communication system according to this embodiment will be described with reference to FIG. 5.

When downlink radio quality degrades, for example, when the SINR (Signal-to-Interference and Noise Ratio) is equal to or less than a threshold value as a reference, the handover sequence starts.

The determination on the degradation of the radio quality may depend on an RSSI (Received Signal Strength Indicator) or the like using about 10 dBµV as a threshold value.

The mobile station 20A transmits an anchor subchannel (ASCH) switching request to the base station 10-1 as a switching source.

The base station 10-1 as a switching source collects and assigns the extra subchannels (ESCH) to the same slot as the anchor subchannel (ASCH) under the control of the subchannel assignment setting unit 15-1. In this way, subchannel assignment information (MAP information) indicating that the anchor subchannel (ASCH) and the extra subchannels (ESCH) are included in one slot is transmitted to the mobile station.

The mobile station 20A searches neighbor base stations through all the relative slots (slots to which the anchor subchannel (ASCH) and the extra subchannels (ESCH) are not assigned at all) not used for communication.

The mobile station 20A transmits a link channel (LCH) setup request to a base stations 10-$n$ (a base station other than the base station 10-1) as the switching destination detected by the search.

The base station 10-$n$ as the switching destination selects an anchor subchannel (ASCH) and transmits the assignment of the link channel (LCH) to the mobile station, when receiving the link channel (LCH) setup request.

The mobile station 20A and the base station 10-$n$ as the switching destination start a communication through the anchor subchannel (ASCH) of the base station 10-$n$ as the switching destination. In the communication of the base station 10-$n$ as the switching destination through the anchor subchannel (ASCH), any of the downlink communication and the uplink communication may be first performed.

When receiving the MAP information for assigning the extra subchannels (ESCH) through the anchor subchannel (ASCH) of the base station 10-$n$ as the switching destination, the mobile station 20A considers that the handover is successful and cuts off the link to the base station 10-1 as the switching source.

Figure 6:
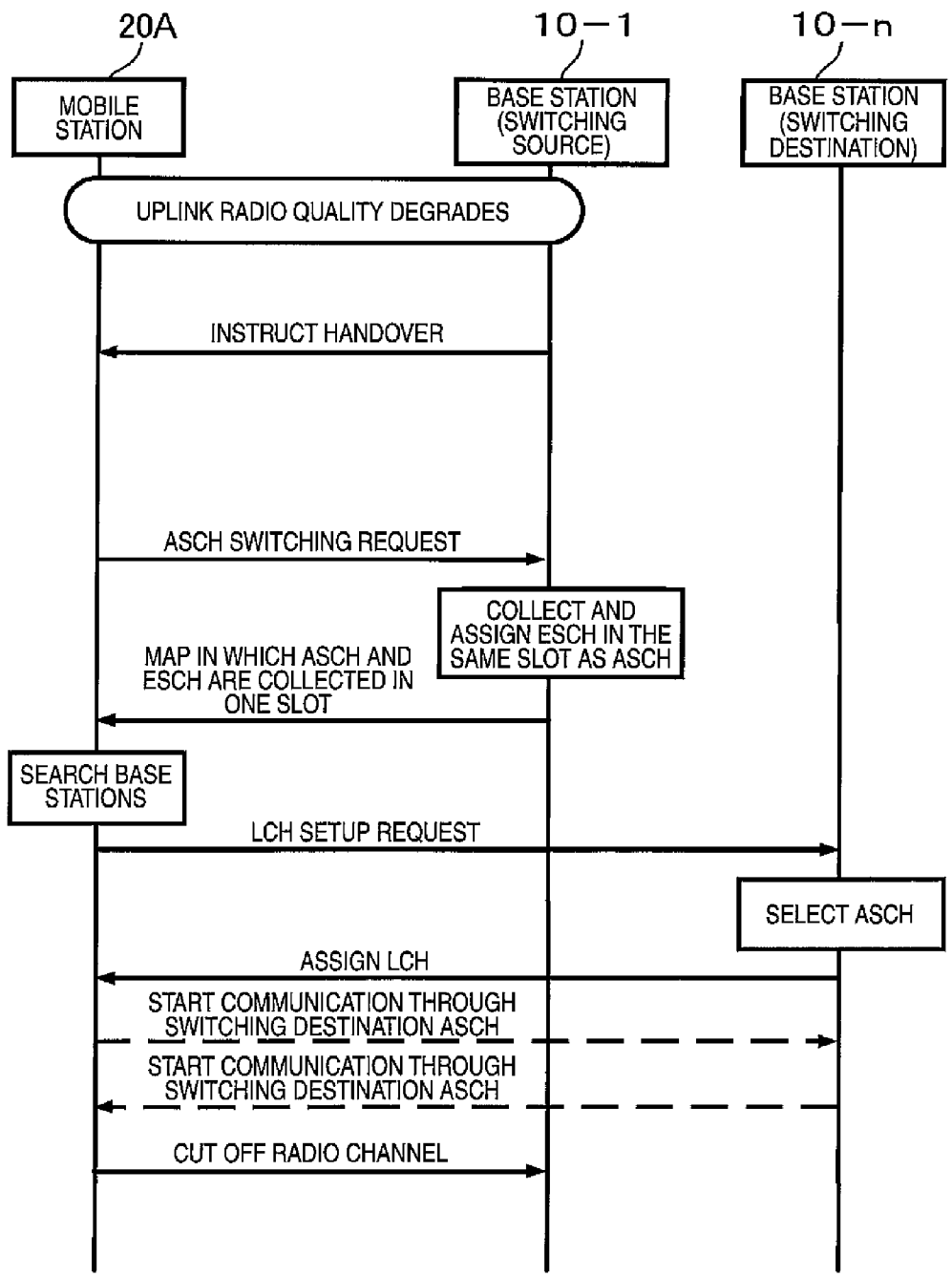
FIG. 6 is a diagram illustrating a handover sequence started by the base station in the communication system according to the first embodiment of the invention.

The handover sequence started by a base station in the communication system according to the first embodiment will be described with reference to FIG. 6.

When uplink radio quality degrades, for example, when the SINR (Signal-to-Interference and Noise Ratio) is equal to or less than a threshold value as a reference, the handover sequence is started.

The determination on the degradation of the radio quality may depend on an RSSI (Received Signal Strength Indicator) or the like using about 10 dBμV as a threshold value.

The base station 10-1 as a switching source transmits a handover instruction to the mobile station 20A.

The mobile station having received the instruction transmits an anchor subchannel (ASCH) switching request to the base station as a switching source.

The base station 10-1 as a switching source collects and assigns the extra subchannels (ESCH) to the same slot as the anchor subchannel (ASCH) under the control of the subchannel assignment setting unit 15-1. In this way, subchannel assignment information (MAP information) indicating that the anchor subchannel (ASCII) and the extra subchannels (ESCH) are included in one slot is transmitted to the mobile station.

The mobile station 20A searches neighbor base stations through all the relative slots (slots to which the anchor subchannel (ASCII) and the extra subchannels (ESCH) are not assigned at all) not used for communication.

The mobile station 20A transmits a link channel (LCH) setup request to a base stations 10-n (a base station other than the base station 10-1) as the switching destination detected by the search.

The base station 10-n as the switching destination selects an anchor subchannel (ASCII) and transmits the assignment of the link channel (LCH) to the mobile station, when receiving the link channel (LCH) setup request.

The mobile station 20A and the base station 10-n as the switching destination start a communication through the anchor subchannel (ASCH) of the base station 10-n as the switching destination. In the communication of the base station 10-n as the switching destination through the anchor subchannel (ASCH), any of the downlink communication and the uplink communication may be first performed.

When receiving the MAP information for assigning the extra subchannels (ESCH) through the anchor subchannel (ASCH) of the base station 10-n as the switching destination, the mobile station 20A considers that the handover is successful and cuts off the link to the base station 10-1 as the switching source.

In the handover sequence started by the mobile station or the handover sequence started by the base station, when the base station receives the anchor subchannel switching request from the mobile station, at least one slot may be released for a control channel used by a base station.

When it is determined by the mobile station that the radio quality is not degraded to be equal to or less than the threshold value at the time of receiving the MAP information indicating that the anchor subchannel (ASCII) and the extra subchannels (ESCH) are included in one slot, the mobile station may perform only the process of searching the base stations as the handover destinations.

Second Embodiment

Configurations of a mobile station and a base station used in a communication system and a communication method according to the second embodiment of the invention will be described.

Figure 7:
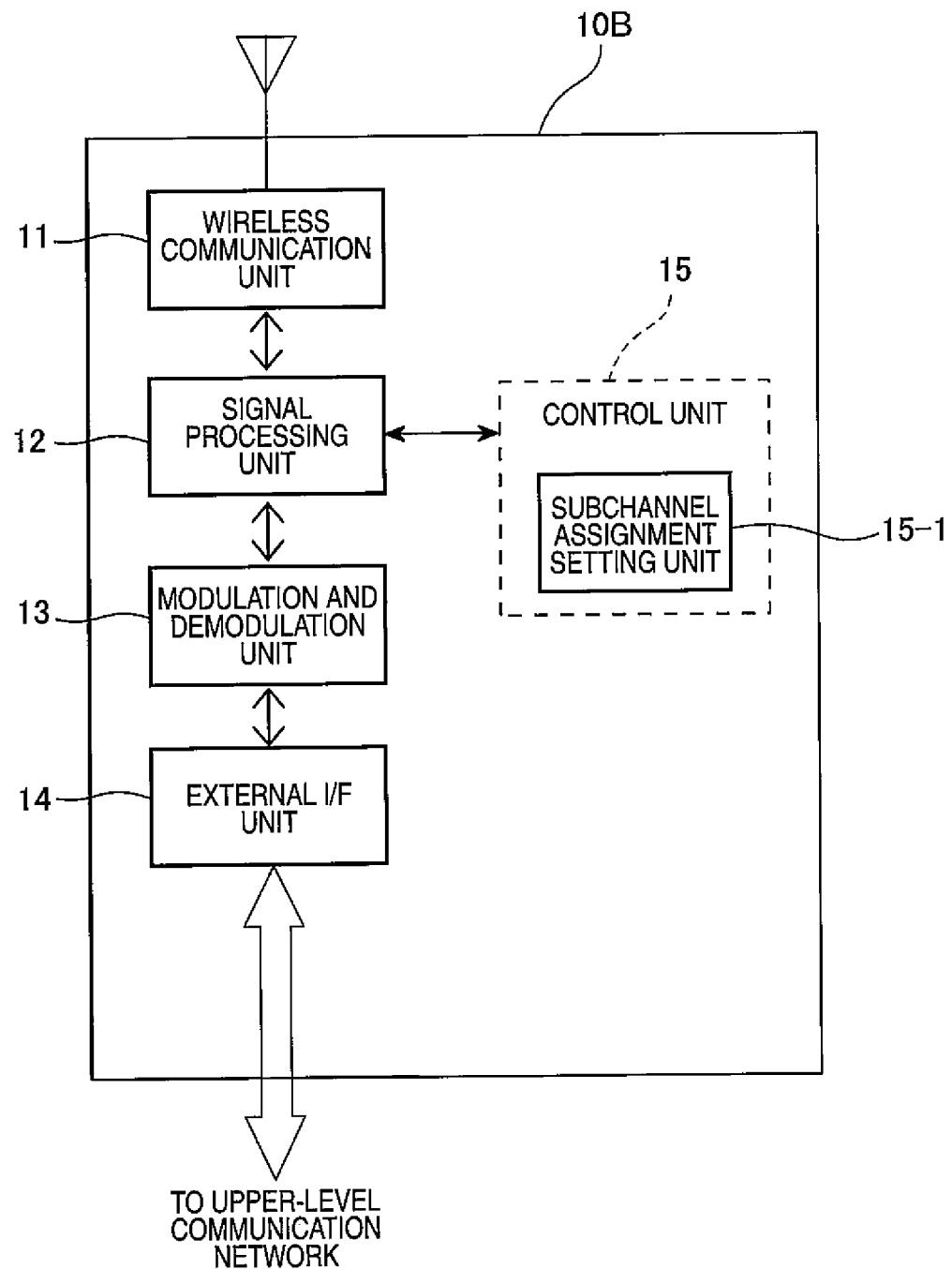
FIG. 7 is a block diagram illustrating a configuration of a base station in a communication system according to a second embodiment of the invention.
Figure 8:
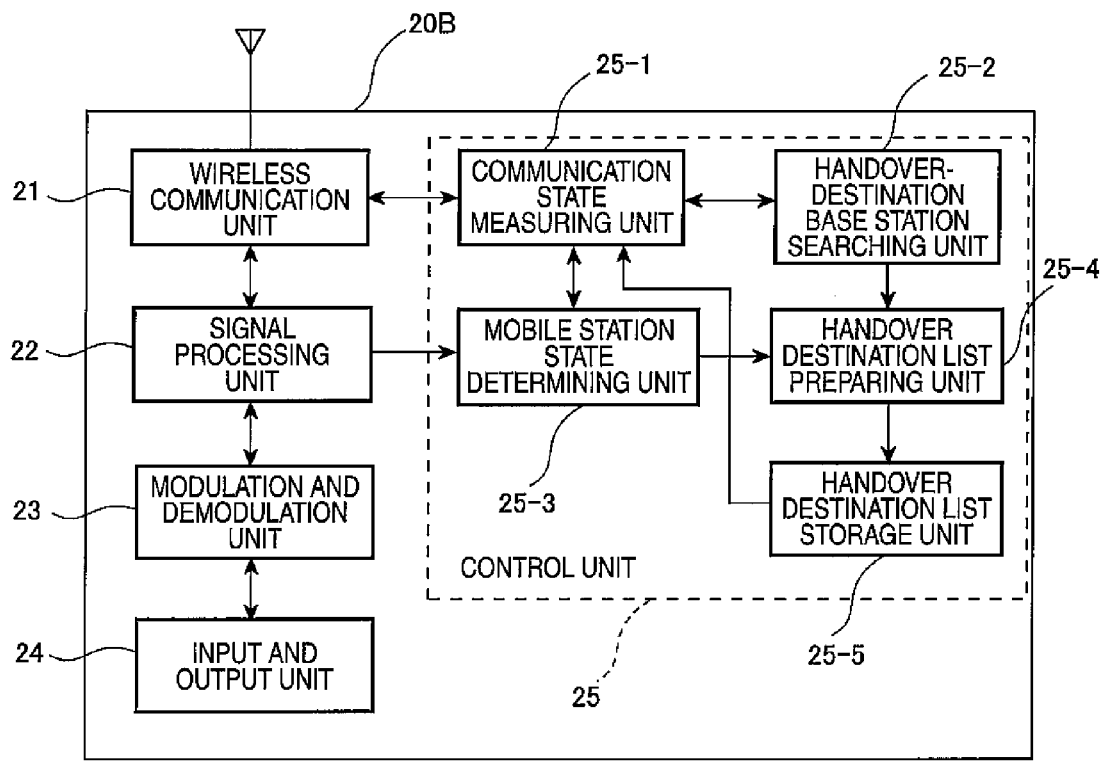
FIG. 8 is a block diagram illustrating a configuration of a mobile station in a communication system according to a second embodiment of the invention.

FIG. 7 is a block diagram illustrating a configuration of a base station and FIG. 8 is a block diagram illustrating a configuration of a mobile station.

As shown in FIG. 7, a base station 10B (base station 10 according to the second embodiment) includes a wireless communication unit 11 which is connected to an antenna and converts a signal from a signal processing unit 12 to be described later into an RF signal or converts the received RF signal into a signal which can be treated by the signal processing unit 12, a signal processing unit 12 which processes a received signal or a transmission signal, a modulation and demodulation unit 13 which modulates or demodulates a signal, an external I/F unit 14 which is connected to an upper-level communication network, and a control unit 15 which controls the signal processing unit 12 and the modulation and demodulation unit 13.

The control unit 15 includes a subchannel assignment setting unit 15-1 setting the assignment of subchannels used in communication to the mobile station.

The subchannel assignment setting unit 15-1 assigns the extra subchannels depending on the communication data amount when data is transmitted and received therethrough (in an active state), but does not assign the extra subchannels when the communication data amount decreases to no transmission data. In this case, the base station connects with the mobile station using only the anchor subchannel. The state where the mobile station is connected with the mobile station using only the anchor subchannel is called as a perch state.

As shown in FIG. 8, a mobile station 20B (mobile station 20 according to the second embodiment) includes a wireless communication unit 21 which is connected to an antenna and converts a signal from a signal processing unit 22 to be described later into an RF signal or converts the received RF signal into a signal which can be treated by the signal processing unit 22, a signal processing unit 22 which processes a received signal or a transmission signal, a modulation and demodulation unit 23 which modulates or demodulates a signal, an input and output unit 24 for inputting and outputting data or sound, and a control unit 25 which controls the signal processing unit 22 and the wireless communication unit 21.

The control unit 25 includes a communication state measuring unit 25-1 which measures a communication state (for example, SINR, RSSI, and the like) with a base station as a handover destination, a handover-destination base station searching unit 25-2 which searches base stations as a handover destination, a mobile station state determining unit 25-3 which determines whether the mobile station 20B is in the active state or the perch state, a handover destination list preparing unit 25-4 which prepares a list of base stations as handover destinations, and a handover destination list storage unit 25-5 which stores the handover destination list including a list of base stations to which priority is given in the order suitable as a handover destination and which are arranged in the priority order and time stamps of date and time of the search on the basis of the search result of the handover-destination base station searching unit 25-2.

Figure 9:
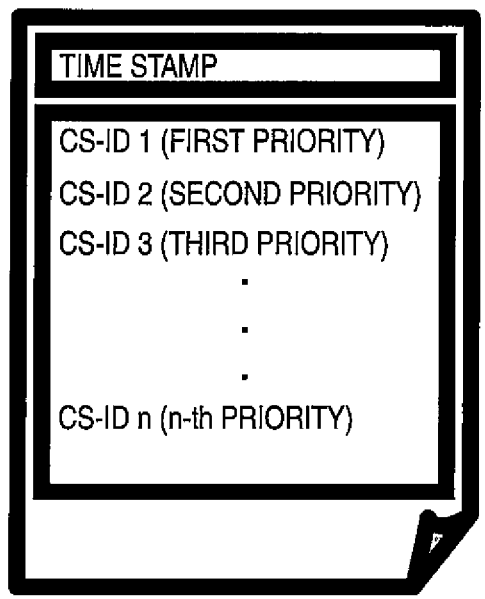
FIG. 9 is a diagram illustrating an example of a handover destination list.

FIG. 9 shows an example of the handover destination list stored in the handover destination list storage unit 25-5.

Information elements of the handover destination list include the time stamps (date and time) when the base stations as the handover destination are searched and identifiers (CS-ID) of the base stations.

The priority of the handover destination is given to the searched base stations on the basis of the communication state measured by the communication state measuring unit 25-1 and the searched base stations are stored.

In preparing the handover destination list shown in FIG. 9, the priority of the handover is given from the base station having the better SINR on the basis of the measured communication state with the base stations, for example, the measured SINR (Signal-to-Interference and Noise Ratio), and the SINR values are not included in the handover destination list for the purpose of reducing the memory amount. An old handover destination list in which a predetermined time passes after the preparation thereof is removed or determined as being invalid with reference to the time stamp.

As the communication state with the base station, an RSSI (Received Signal Strength Indicator) or the like may be measured.

The flow of a handover destination list preparing process will be described with reference to FIG. 10.

The mobile station state determining unit 25-3 detects that the state of the mobile station 20B is changed from the active state as a normal communication state where data is transmitted and received to a state where the data amount decreases and transmission data does not exist, that is, the perch state where the extra subchannels are not assigned and the mobile station is connected using only the anchor subchannel (step S1). When the mobile station is changed to the perch state (YES in step S1), it is determined whether the handover destination list exists in the handover destination list storage unit 25-5 (step S2).

When the handover destination list exists (YES in step S2), the time stamp of the handover destination list is compared with the current time to determine whether a predetermined time passes after previously preparing the list (step S3).

When the handover destination list does not exist (NO in step S2) or when a predetermined time passes after previously preparing the list (YES in step S3), the process of step S4 is performed. On the other hand, when a predetermined time does not pass after previously preparing the list (NO in step S3), the process of step S5 to be described later is performed.

The handover-destination base station searching unit 25-2 searches the neighbor base stations using the control channels (CCH) of the slots other than the slot to which the anchor subchannel is assigned (step S4).

When the search ends, the handover destination list preparing unit 25-4 prepares the handover destination list (step S5). The prepared handover destination list is stored in the handover destination list storage unit 25-5.

The handover destination list is prepared as follows.

The communication state measuring unit 25-1 measures the communication states (for example, SINR, RSSI, and the like) of the base stations searched in step S4. The base station of which the measured communication state is equal to or more than a predetermined threshold value is called a handover-enable base station, and the handover-enable base stations are ordered from the base station having a better communication state. The handover-disable base stations should not be included in the list. The time stamps of the search time in step S5 and the identifiers (CS-ID) of the base stations are described to obtain a handover destination list.

The mobile station state determining unit 25-3 determines whether the mobile station is kept in the perch state (step S6).

When the perch state is maintained (YES in step SG), the process of step S2 is performed again. On the other hand, when the perch state ends (NO) in step S6), the communication state is changed to the active state (step S7).

Figure 11:
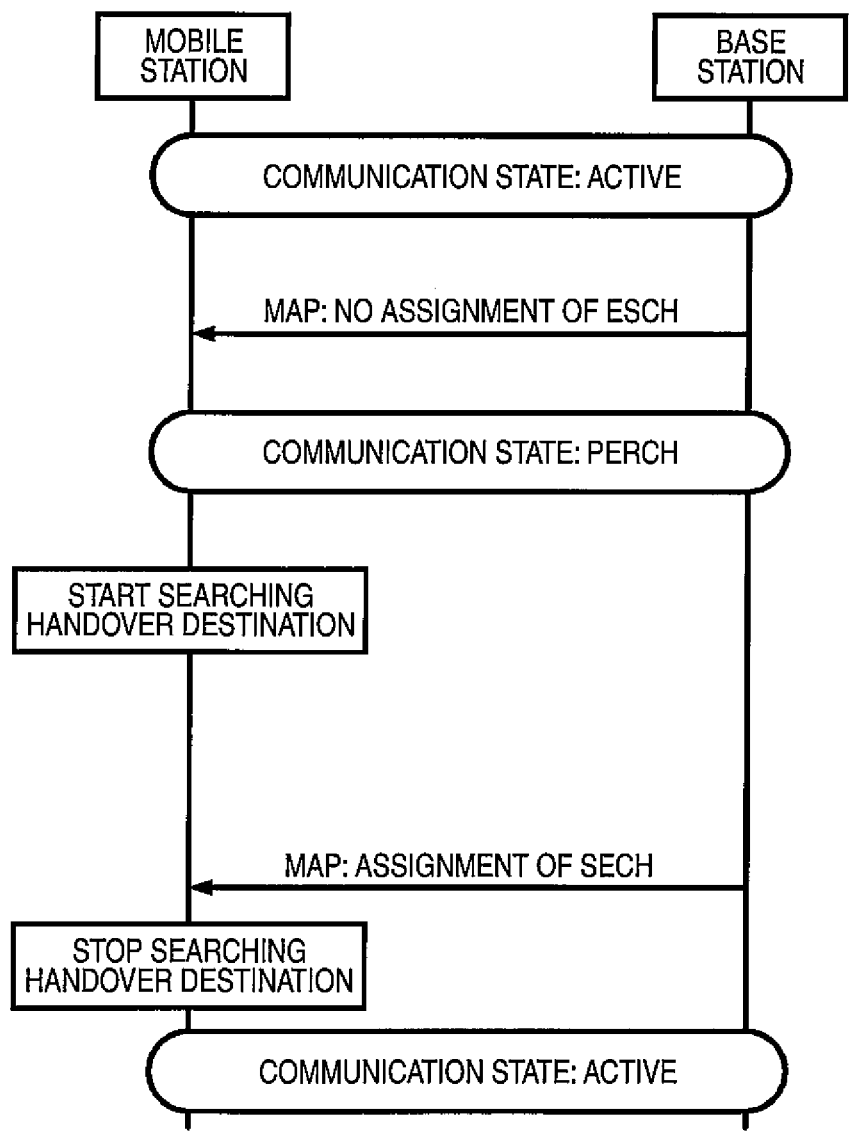
FIG. 11 is a diagram illustrating a sequence between a mobile station and a base station from the start of preparing the handover destination list to the end thereof.

A sequence performed between the mobile station and the base station from the start of the preparation of the handover destination list to the end thereof will be described with reference to FIG. 11.

When the communication state between the mobile station and the base station is active and the MAP information included in the anchor subchannel and transmitted from the base station does not include the assignment of extra subchannels, the communication state is changed to the perch state.

Figure 10:
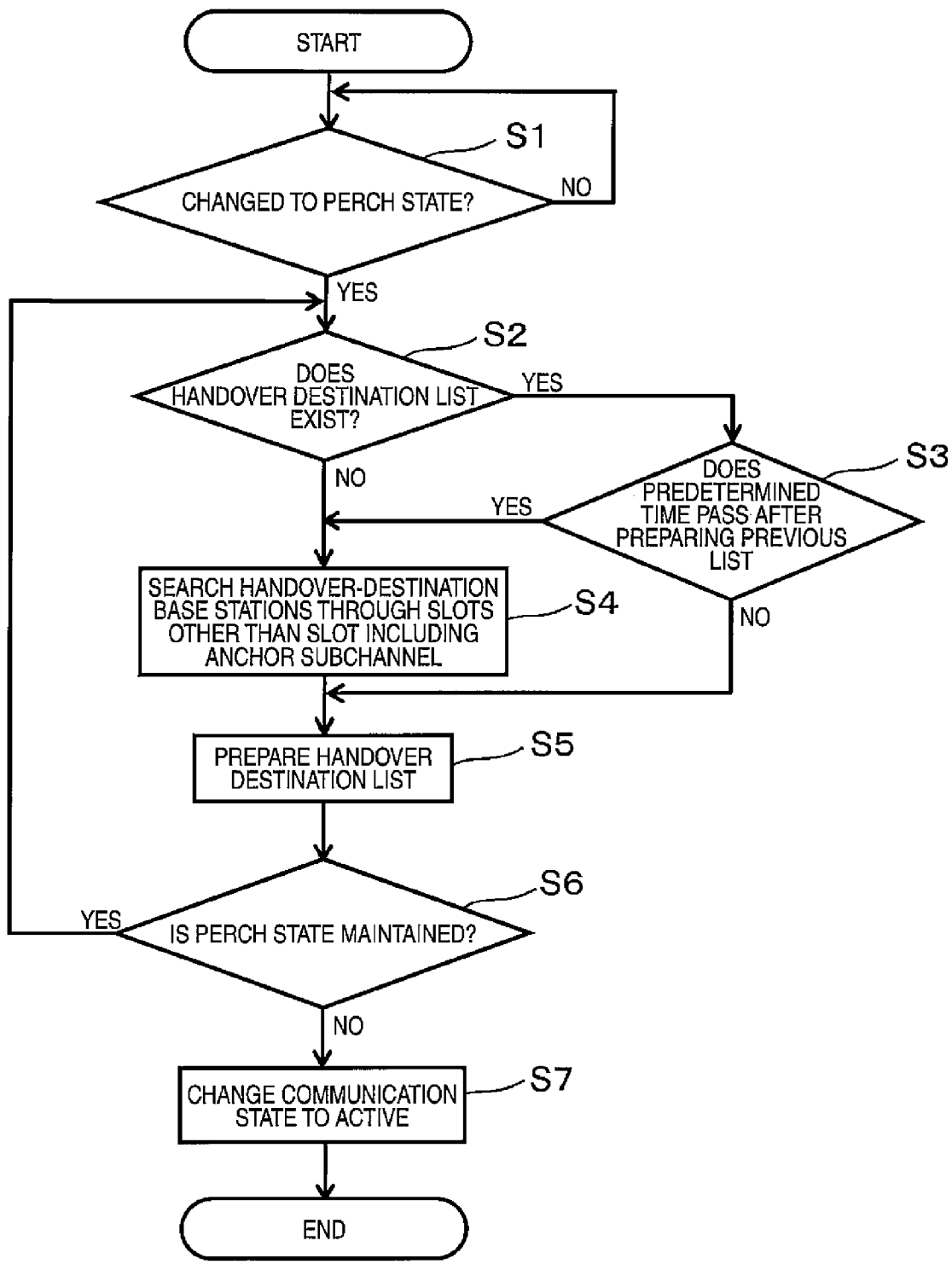
FIG. 10 is a block diagram illustrating a flow of a handover destination list preparing process.

After the communication state is changed to the perch state, the mobile station starts the flow of searching the base stations as the handover destination, as shown in FIG. 10. When the search of the base stations as the handover destination in all the other slots in this period ends, the search process is once stopped at that time. When this period is continued after the search process ends and a predetermined time passes after the previous search time, the flow of searching the base stations as the handover destination is performed again.

When the MAP information included in the anchor subchannel and transmitted from the base station includes the assignment of the extra subchannels, the flow of searching the base stations as the handover destination is stopped. At this time, the handover destination list is prepared as shown in FIG. 10.

The communication state is changed to the active state.

The handover sequence in the communication system according to this embodiment will be described.

First, a flow from the detection of the degradation in radio quality in communication to the transmission of the link channel (LCH) setup request for the handover will be first described with reference to FIG. 12.

Figure 12:
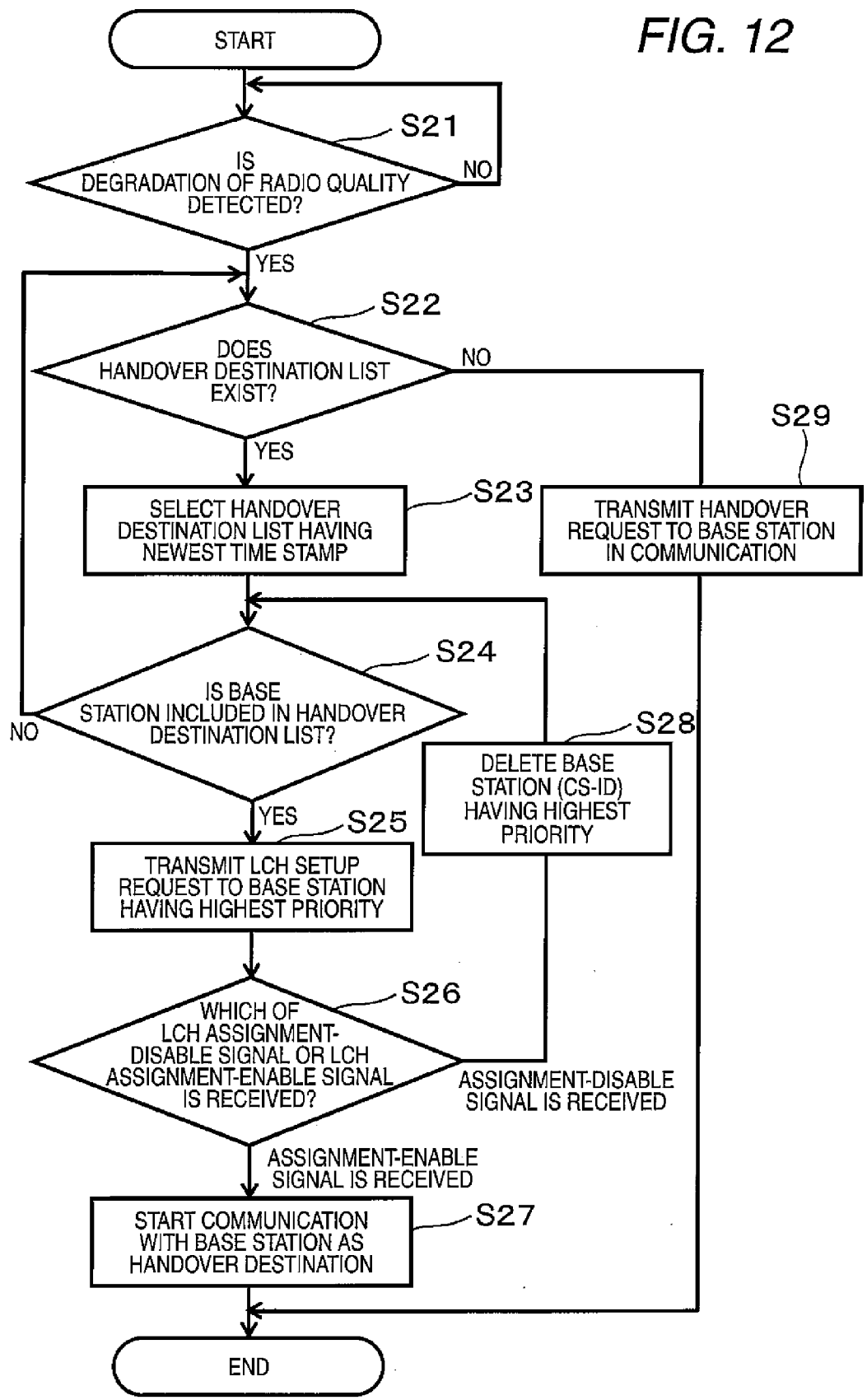
FIG. 12 is a flow diagram illustrating a handover sequence in the communication system according to the second embodiment of the invention.

As shown in FIG. 12, when the mobile station detects the degradation in radio quality (step S21), that is, when the SINR in the anchor subchannel of a downlink is equal to or less than a reference value, the mobile station determines whether a handover destination list exists (step S22). When the handover destination list exists (YES in step S22), a list having the newest time stamp (the time stamp closest to the current time) is selected (step S23).

When only one handover destination list exists, the list is used. Then, it is determined whether base stations (CS-ID) are included in the selected handover destination list (step S24).

When base stations (CS-ID) are included in the list (YES in step S24), the link channel (LCH) setup request is transmitted to the base station having the highest priority among the base stations included in the selected handover destination list (step S25).

It is determined whether a signal received from the base station in response to the link channel (LCH) setup request is a link channel (LCH) assignment-disable signal or a link channel (LCH) assignment-enable signal (step S26).

When the link channel (LCH) assignment-enable signal is received, the communication with the base station is started (step S27).

On the other hand, when the link channel (LCH) assignment-disable signal is received, the base station having the highest priority is deleted from the handover destination list (CS-ID is deleted) (step S28). Then, the process of step S24 is performed again. That is, the base station having the second highest priority transmits the link channel (LCH) setup request (when the assignment thereof is disabled, the base stations having the third highest priority, the fourth highest priority, . . . and the lowest priority in the list sequentially transmit the link channel (LCH) setup request).

The above-mentioned process may be ended in the base station having predetermined priority.

When the handover destination list does not exist (NO in step S22) or when the base stations (CS-ID) are not included in the selected handover destination list (NO in step S24), a handover request is transmitted to the base station in communication (step S29). That is, it is notified that a high-efficiency handover algorithm cannot be started. Accordingly, the handover algorithm is changed to current algorithm.

Figure 13:
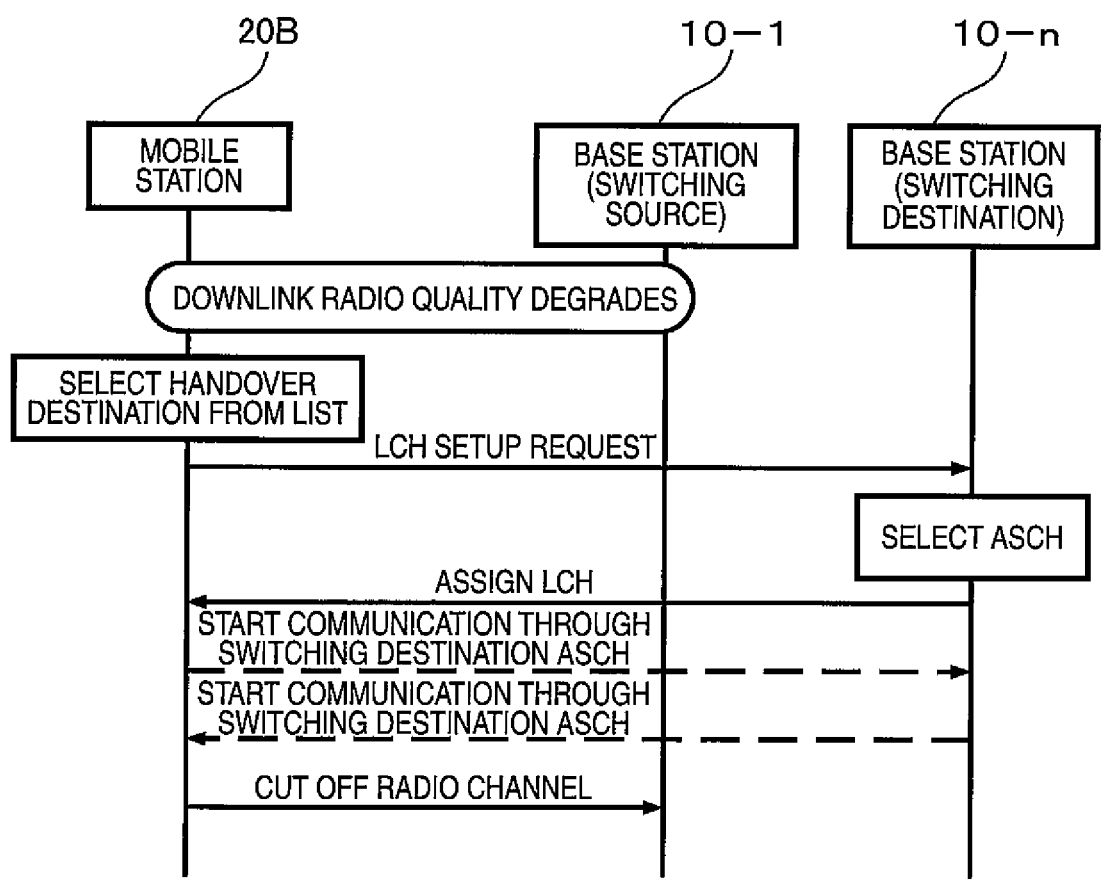
FIG. 13 is a diagram illustrating the handover sequence started by the mobile station in the communication system according to the second embodiment of the invention.

The handover sequence started by a mobile station in the communication system according to this embodiment will be described with reference to FIG. 13.

When downlink radio quality degrades, for example, when the SINR (Signal-to-Interference and Noise Ratio) is equal to or less than a threshold value as a reference, the handover sequence starts.

The determination on the degradation of the radio quality may depend on an RSSI (Received Signal Strength Indicator) or the like using about 10 dBµV as a threshold value.

The mobile station 20B selects a base station 10-n (a base station other then the base station 10-1) as the handover destination (switching destination) by the flow shown in FIG. 10 using the above-mentioned handover destination list.

The link channel (LCH) setup request is transmitted to the selected base station as the switching destination.

The base station 10-n as the switching destination selects the anchor subchannel (ASCH) in response to the setup request and transmits the link channel (LCH) assignment signal to the mobile station.

The mobile station 20B and the base station 10-n as the switching destination start a communication through the anchor subchannel (ASCH) of the base station 10-n as the switching destination. In the communication of the base station 10-n as the switching destination through the anchor subchannel (ASCII), any of the downlink communication and the uplink communication may be first performed.

When receiving the MAP information for assigning the extra subchannels (ESCH) through the anchor subchannel (ASCH) of the base station 10-n as the switching destination, the mobile station considers that the handover is successful and cuts off the link to the base station 10-1 as the switching source.

Figure 14:
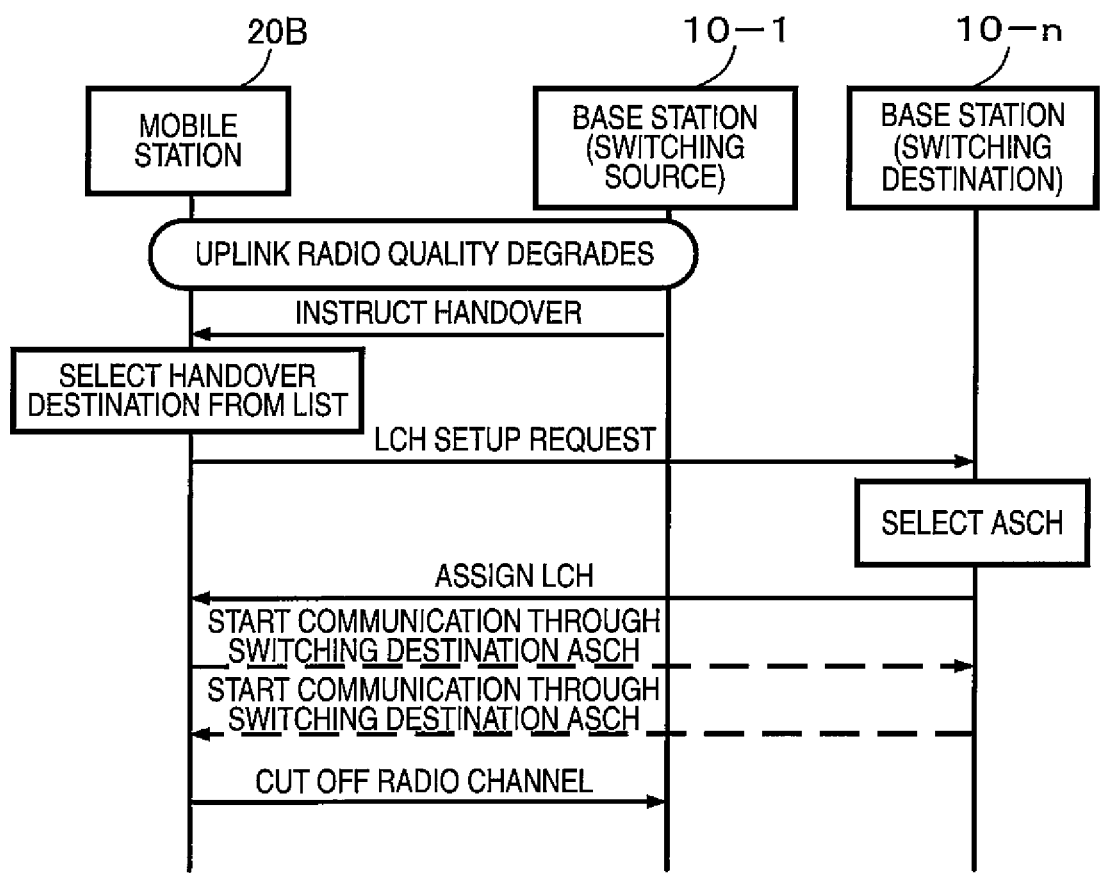
FIG. 14 is a diagram illustrating the handover sequence started by the base station in the communication system according to the second embodiment of the invention.
Figure 15:
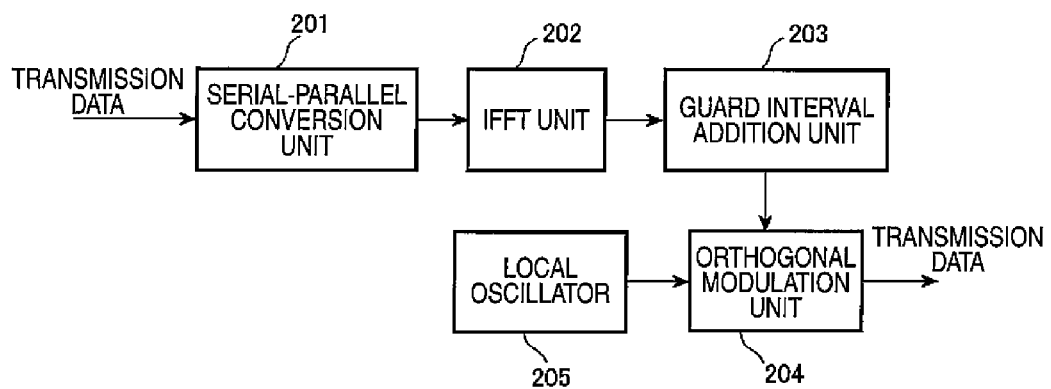
FIG. 15 is a block diagram illustrating a configuration of an OFDM modulator used in a transmission party.
Figure 16:
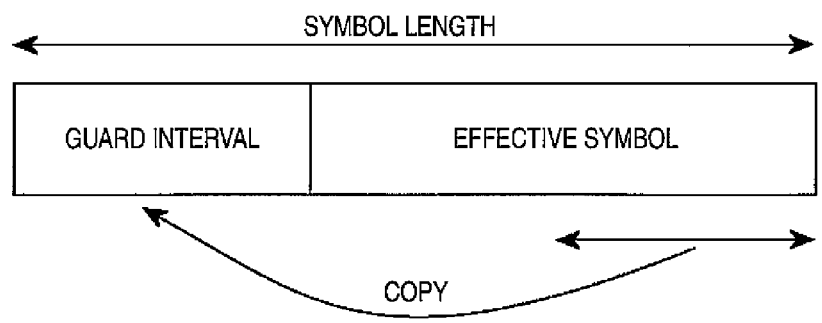
FIG. 16 is a diagram illustrating a guard interval.
Figure 17:
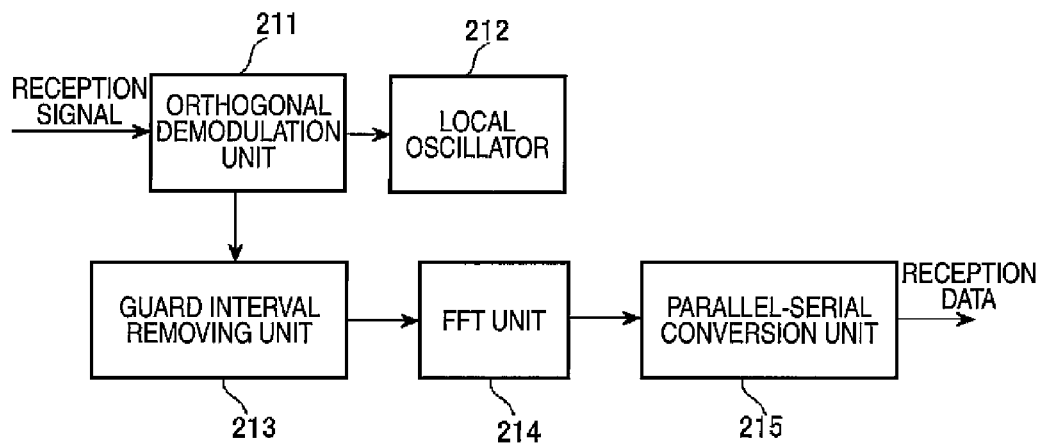
FIG. 17 is a block diagram illustrating a configuration of an OFDM modulator used in a reception party.
Figure 18:
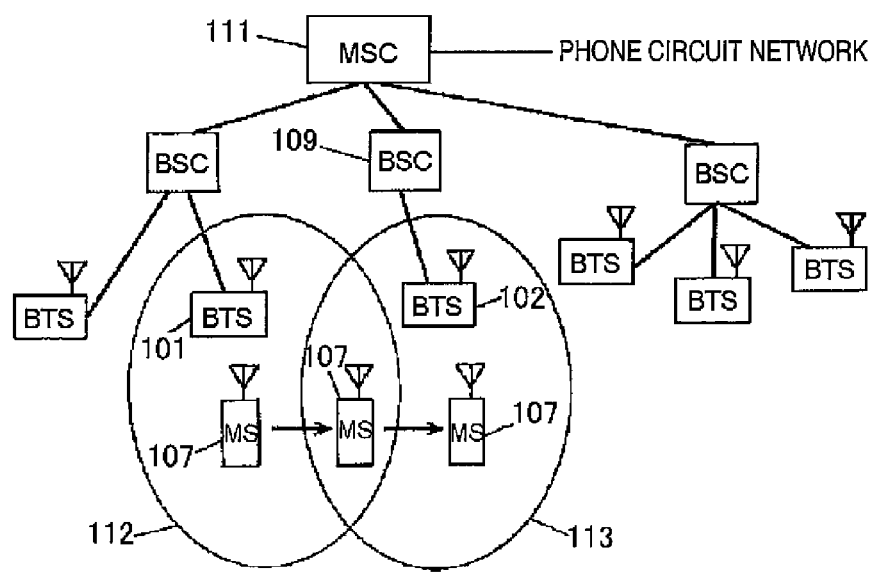
FIG. 18 is a diagram illustrating a configuration of a past mobile station network and a state where a mobile station moves from a cell of a base station to a cell of another base station.

The handover sequence started by a base station in the communication system according to this embodiment will be described with reference to FIG. 14.

When uplink radio quality degrades, for example, when the SINR (Signal-to-Interference and Noise Ratio) is equal to or less than a threshold value as a reference, the handover sequence starts.

The determination on the degradation of the radio quality may depend on an RSSI (Received Signal Strength Indicator) or the like using about 10 dBµV as a threshold value.

The base station 10-1 as the switching source transmits a handover instruction to the mobile station 20B. The mobile station 20B having received this instruction selects a base station 10-n (a base station other then the base station 10-1) as the handover destination (switching destination) by the flow shown in FIG. 8 using the above-mentioned handover destination list.

The link channel (LCH) setup request is transmitted to the selected base station 10-n as the switching destination.

The base station 10-n as the switching destination selects the anchor subchannel (ASCH) in response to the setup request and transmits the link channel (LCH) assignment signal to the mobile station 20B.

The mobile station 20B and the base station 10-n as the switching destination start a communication through the anchor subchannel (ASCII) of the base station 10-n as the switching destination. In the communication of the base station 10-n as the switching destination through the anchor subchannel (ASCH), any of the downlink communication and the uplink communication may be first performed.

When receiving the MAP information for assigning the extra subchannels (ESCH) through the anchor subchannel (ASCH) of the base station 10-n as the switching destination, the mobile station 20B considers that the handover is successful and cuts off the link to the base station 10-1 as the switching source.

The present application is based on Japanese Patent Application No. 2006-293240 filed on Oct. 27, 2006 and Japanese Patent Application No. 2006-293242 filed on Oct. 27, 2006, the contents of which are incorporated herein by reference.

What is claimed is:

1. An OFDMA communication system in which data communication is performed between a plurality of base stations and a plurality of mobile stations, wherein each of the base stations comprises a subchannel assignment setting unit which sets assignment of subchannels including a first subchannel and a second subchannel for each of the mobile stations, the first subchannnel including information indicating usable or unusable subchannels of the respective mobile stations and being assigned to the respective mobile stations, the second subchannel including actually-used data, and wherein when a request for switching the first subchannel is received from one of the plurality of mobile stations, the second subchannel is collected and assigned to a same slot as the first subchannel assigned to the one of the mobile station.

2. A mobile station used in the OFDMA communication system according to claim 1, the mobile station comprising:

a communication state measuring unit which measures a communication state with a base station as a switching destination; and a switching-destination base station searching unit which searches a base station as a switching destination.

3. A base station switching method for a handover in the OFDMA communication system according to claim 1, the method comprising:

transmitting a request for switching the first subchannel from a mobile station to a base station as a switching source when a downlink radio quality degrades;

collecting and assigning the second subchannel to a same slot as the first subchannel in the base station as the switching source, and transmitting information on subchannel assignment in with the first subchannel and the second subchannel are collected in the same slot, to the mobile station;

receiving the information on the subchannel assignment and searching neighbor base stations using all relative slots not used in communication by the mobile station; and setting up a link between the mobile station and a base station as a switching destination detected by the searching and cutting off a link between the mobile station and the base station as the switching source.

4. A base station switching method for a handover in the OFDMA communication system according to claim 1, the method comprising:

transmitting a handover instruction from a base station as a switching source to a mobile station when an uplink radio quality degrades;

receiving the handover instruction and transmitting a request for switching the first subchannel from the mobile station to the base station as the switching source;

collecting and assigning the second subchannel to a same slot as the first subchannel in the base station as the switching source, and transmitting information on subchannel assignment in which the first subchannel and the second subchannel are collected in the same slot, to the mobile station;

receiving the information on the subchannel assignment and searching neighbor base stations using all relative slots not used in communication by the mobile station; and setting up a link between the mobile station and a base station as a switching destination detected by the searching ad cutting off a link between the mobile station and the base station as the switching source.

5. An OFDMA communication system in which data communication is performed between a plurality of base stations and a plurality of mobile stations, wherein each of the base stations comprises a subchannel assignment setting unit which sets assignment of subchannels including a first subchannel and a second subchannel for each of the mobile stations, the first subchannel including information indicating usable or unusable subchannels of the respective mobile stations and being assigned to the respective mobile stations, the second subchannel including actually-used data, and wherein when a request for switching the first subchannel is received from one of the plurality of mobile stations, at least one slot is released for a control channel used by a base station and the second subchannel is collected and assigned to a same slot as the first subchannel assigned to the one of the mobile station.

6. An OFDMA communication system in which data communication is performed between a plurality of base stations and a mobile station, the communication system comprising:

a mobile station state determining unit which determines a state of the mobile station a handover-destination base station searching unit which searches base stations as handover destination candidates when the mobile station state determining unit determines that the mobile station is in a perch state;

a communication state measuring unit which measures a communication state with the base stations as the handover destination candidates; and a handover destination list preparing unit which prepares a handover destination list including a priority order of the base stations as the handover destination candidates on the basis of the communication state measured by the communication state measuring unit, wherein when a handover becomes necessary, a connection between the mobile station and the base stations as the handover destination candidates is tried in accordance with the priority order in the handover destination list, wherein a base station connects with a mobile station using a first subchannel and a second subchannel, where in the first subchannel including information indicating usable or unusable subchannels of the mobile station and which is assigned to the mobile station, the second subchannel including actually used data;

wherein when a request for switching the first subchannel is received from one of the plurality of mobile stations, the second subchannel is collected and assigned to a same slot as the first subchannel assigned to the one of the mobile station.

7. The OFDMA communication system according to claim 6, wherein a time stamp of date and time when the list is prepared is recorded in the handover destination list, and wherein when a plurality of the handover destination lists exist, a handover destination list having a newest time stamp is used.

8. A base station used in the OFDMA communication system according to claim 6, wherein when a communication data amount decreases to no transmission data, the base station connects with a mobile station using only a first subchannel including information indicating usable or unusable subchannels of the mobile station and which is assigned to the mobile station.

9. A base station switching method for a handover in the OFDMA communication system according to claim 6, the method comprising:

selecting a base station as a switching destination using the handover destination list by the mobile station when a downlink radio quality degrades; and setting up a link between the mobile station and the selected base station as the switching destination and cutting off a link between the mobile station and a base station us a switching source.

10. A base station switching method for a handover in the OFDMA communication system according to claim 6, the method comprising:

transmitting a handover instruction from a base station as a switching source to a mobile station when an uplink radio quality degrades;

receiving the handover instruction and selecting a base station as a switching destination using the handover destination list in the mobile station; and setting up a link between the mobile station and the selected base station as the switching destination and cutting off a link between the mobile station and the base station as the switching source.

11. A base station comprising;

a subchannel assignment setting unit which sets assignment of subchannels including a first subchannel and a second subchannel for each of a plurality of mobile stations, the first subchannel including information indicating usable or unusable subchannels of the respective mobile stations and being assigned to the respective mobile stations, the second subchannel including actually-used data, wherein when a request for switching the first subchannel is received from one of the plurality of mobile stations, information on subchannel assignment in which the second subchannel is collected and assigned to a same slot as the first subchannel is transmitted in the one of the mobile stations.

12. A mobile station in an OFDMA communication system, the mobile station comprising:

a mobile station state determining unit which determines a state of the mobile station;

a handover-destination base station searching unit which searches base stations as handover destination candidates when the mobile station state determining unit determines that the mobile station is in a perch state;

a communication state measuring unit which measures a communication state with the base stations as the handover destination candidates;

a handover destination list preparing unit which prepares a handover destination list including a priority order of the base stations as the handover destination candidates on the basis of the communication state measured by the communication state measuring unit; and a handover destination list storage unit which stores the handover destination list while adding a time stamp of date and time when the base stations as the handover destination candidates are searched;

wherein a base station connects with a mobile station using a first subchannel and a second subchannel, where in the first subchannel including information indicating usable or unusable subchannels of the mobile station and which is assigned to the mobile station, the second subchannel including actually used data;

wherein when a request for switching the first subchannel is received from one of the plurality of mobile stations, the second subchannel is collected and assigned to a same slot as the first subchannel assigned to the one of the mobile station.

\* \* \* \* \*